United States Patent
Wu et al.

(10) Patent No.: US 11,392,660 B2
(45) Date of Patent: Jul. 19, 2022

(54) PRESENTATION OF INFORMATION ON MULTIPLE DEVICES

(71) Applicant: eBay Inc., San Jose, CA (US)

(72) Inventors: Junlong Wu, Shanghai (CN); Shenyi Ge, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/091,796

(22) Filed: Nov. 6, 2020

(65) Prior Publication Data

US 2021/0056156 A1     Feb. 25, 2021

Related U.S. Application Data

(63) Continuation of application No. 16/584,563, filed on Sep. 26, 2019, now Pat. No. 10,902,079, which is a continuation of application No. 15/902,735, filed on Feb. 22, 2018, now Pat. No. 10,489,475, which is a continuation of application No. 15/589,969, filed on May 8, 2017, now Pat. No. 9,934,318, which is a
(Continued)

(51) Int. Cl.
| | |
|---|---|
| *G06F 16/955* | (2019.01) |
| *G06K 19/06* | (2006.01) |
| *H04L 67/02* | (2022.01) |
| *G06F 16/954* | (2019.01) |

(52) U.S. Cl.
CPC ........ *G06F 16/9554* (2019.01); *G06F 16/954* (2019.01); *G06K 19/06028* (2013.01); *G06K 19/06037* (2013.01); *H04L 67/02* (2013.01)

(58) Field of Classification Search
CPC .............. G06F 16/9554; G06F 16/954; G06K 19/06028; G06K 19/06037; H04L 67/02
See application file for complete search history.

(56) References Cited

U.S. PATENT DOCUMENTS

| | | |
|---|---|---|
| 9,128,947 B2 | 9/2015 | Raina |
| 9,646,101 B1 | 5/2017 | Wu et al. |
| 9,934,318 B2 | 4/2018 | Wu et al. |

(Continued)

FOREIGN PATENT DOCUMENTS

| | | |
|---|---|---|
| CN | 102902761 A | 1/2013 |
| CN | 104035647 A | 9/2014 |

(Continued)

OTHER PUBLICATIONS

Office Action received for Korean Patent Application No. 10-2018-7014023, dated Oct. 30, 2019, 9 pages (5 pages of Official copy and 4 pages of English Translation).

(Continued)

*Primary Examiner* — Seung H Lee
(74) *Attorney, Agent, or Firm* — FIG. 1 Patents

(57) ABSTRACT

A computer-implemented method of information presentation on multiple devices is provided. The method may include presenting a first barcode on a webpage. The first barcode may be encoded with first data based on a uniform resource locator of the webpage. The method may also include generating second data based on a user interaction with the webpage and altering a configuration of the webpage based on the user interaction without leaving the webpage. The method may also include generating a second barcode encoded with the first data and the second data. The method may further include presenting the second barcode on the webpage with the altered configuration.

20 Claims, 7 Drawing Sheets

Related U.S. Application Data continuation of application No. 14/943,770, filed on Nov. 17, 2015, now Pat. No. 9,646,101.

(56) References Cited

U.S. PATENT DOCUMENTS

| | | |
|---|---|---|
| 10,489,475 B2 | 11/2019 | Wu |
| 10,902,079 B2 | 1/2021 | Wu et al. |
| 2011/0295502 A1 | 12/2011 | Faenger |
| 2012/0036226 A1 | 2/2012 | Chor |
| 2012/0128267 A1 | 5/2012 | Dugan et al. |
| 2012/0150750 A1 | 6/2012 | Law et al. |
| 2012/0168493 A1 | 7/2012 | Worms et al. |
| 2012/0198531 A1 | 8/2012 | Ort et al. |
| 2012/0210242 A1 | 8/2012 | Burckart et al. |
| 2013/0086465 A1 | 4/2013 | Boudville |
| 2013/0167208 A1 | 6/2013 | Shi |
| 2013/0212286 A1 | 8/2013 | Krishnakumar et al. |
| 2013/0299571 A1 | 11/2013 | Metso |
| 2014/0047322 A1 | 2/2014 | Kim et al. |
| 2014/0059124 A1 | 2/2014 | Song et al. |
| 2014/0100899 A1 | 4/2014 | Boudville |
| 2014/0197232 A1 | 7/2014 | Birkler et al. |
| 2014/0333509 A1 | 11/2014 | Yuann et al. |
| 2015/0041530 A1 | 2/2015 | Burkhart et al. |
| 2015/0154592 A1 | 6/2015 | Ioannidis et al. |
| 2015/0237147 A1 | 8/2015 | Sundaresan |
| 2015/0365909 A1 | 12/2015 | Cacioppo |
| 2017/0140061 A1 | 5/2017 | Wu et al. |
| 2017/0242929 A1 | 8/2017 | Wu et al. |
| 2018/0181672 A1 | 6/2018 | Wu et al. |
| 2020/0019581 A1 | 1/2020 | Wu et al. |

FOREIGN PATENT DOCUMENTS

| | | |
|---|---|---|
| CN | 104885065 A | 9/2015 |
| CN | 108292298 A | 7/2018 |
| EP | 2397979 A1 | 12/2011 |
| KR | 10-2000-0053638 A | 8/2000 |
| KR | 10-2013-0000408 A | 1/2013 |
| KR | 10-2015-0098194 A | 8/2015 |
| WO | 2013/046231 A1 | 4/2013 |
| WO | 2017/087147 A1 | 5/2017 |

OTHER PUBLICATIONS

Notice of Allowance received for Korean Patent Application No. 10-2020-7024668, dated Nov. 19, 2020, 3 pages(2 pages of official copy & 1 page of English translation).
Corrected Notice of Allowability received for U.S. Appl. No. 14/943,770, dated Mar. 15, 2017, 9 pages.
Non-Final Office Action received for U.S. Appl. No. 14/943,770, dated Jul. 8, 2016, 13 pages.
Notice of Allowance received for U.S. Appl. No. 14/943,770, dated Apr. 10, 2017, 9 pages.
Notice of Allowance received for U.S. Appl. No. 14/943,770, dated Dec. 15, 2016, 11 pages.
Notice of Allowance received for U.S. Appl. No. 15/589,969, dated Nov. 20, 2017, 15 pages.
Pre-Interview First Office Action received for U.S. Appl. No. 15/589,969, dated Sep. 26, 2017, 4 pages.
Final Office Action received for U.S. Appl. No. 15/902,735, dated May 16, 2019, 7 pages.
Non-Final Office Action received for U.S. Appl. No. 15/902,735, dated Feb. 15, 2019, 13 pages.
Notice of Allowance received for U.S. Appl. No. 15/902,735, dated Jul. 24, 2019, 9 pages.
International Written Opinion received for PCT Application No. PCT/US2016/059722, dated Jan. 23, 2017, 4 pages.
International Search Report received for PCT Application No. PCT/US2016/059722, dated Jan. 23, 2017, 2 pages.
Office Action Received for Chinese Patent Application No. 201680066467.3, dated Nov. 25, 2020, 12 pages.
Communication Pursuant to Article 94(3) EPC Received for European Patent Application No. 16866839.0, dated Jan. 16, 2020, 7 pages.
Extended European Search Report received for European Patent Application No. 16866839.0, dated Feb. 20, 2019, 10 pages.
Summons to Attend Oral Proceedings pursuant to Rule 115(1) EPC Received for European Patent Application No. 16866839.0, dated Aug. 20, 2020, 10 Pages.
Final Office Action Received for U.S. Appl. No. 16/584,563, dated Aug. 26, 2020, 10 Pages.
Non Final Office Action Received for U.S. Appl. No. 16/584,563, dated May 27, 2020, 8 pages.
Notice of Allowance received for U.S. Appl. No. 16/584,563, dated Oct. 15, 2020, 9 pages.
Notice of Allowance received for Korean Patent Application No. 10-2021-7004674, dated May 13, 2021, 3 Pages(2 Pages of Official Copy & 1 page of English Translation).
Office Action received for Chinese Patent Application No. 201680066467.3 dated Mar. 12, 2021, 12 pages(8 Pages of Official Copy & 2 Pages of English Translation).
International Preliminary Report on Patentability for PCT Application No. PCT/US2016/059722, dated May 31, 2018,6 pages.
Office Action received for Chinese Patent Application No. 201680066467.3 dated Jul. 19, 2021, 11 Pages(9 Pages of Official Copy & 2 Pages of English Translation).
EPO Decision to refuse Received for European Patent Application No. 16866839.0 , dated Mar. 10, 2021, 16 Pages.
Office Action received for Korean Patent Application No. 10-2021-7024962 dated Nov. 15, 2021, 8 Pages(4 Pages of English Translation & 4 Pages of Official Copy).
Decision of Rejection received for Chinese Patent Application No. 201680066467.3, dated Jan. 7, 2022, 9 pages (2 pages of English translation and 7 pages of official copy).
U.S. Appl. No. 16/584,563, filed Sep. 26, 2019, Allowed.
U.S. Appl. No. 15/902,735, filed Feb. 22, 2018, Issued.
U.S. Appl. No. 15/589,969, filed May 8, 2017, Issued.
U.S. Appl. No. 14/943,770, filed Nov. 17, 2015, Issued.

PRESENTATION OF INFORMATION ON MULTIPLE DEVICES

CROSS-REFERENCE TO RELATED APPLICATION

This application is a continuation of U.S. patent application Ser. No. 16/584,563, filed Sep. 26, 2019 which is a continuation of U.S. patent application Ser. No. 15/902,735, now U.S. Pat. No. 10,489,475 filed Feb. 22, 2018, which is a continuation of U.S. patent application Ser. No. 15/589,969, filed May 8, 2017, now U.S. Pat. No. 9,934,318, issued Apr. 3, 2018, which is a continuation of U.S. patent application Ser. No. 14/943,770, filed Nov. 17, 2015, now U.S. Pat. No. 9,646,101, issued May 9, 2017; the entire disclosures of which are hereby incorporated by reference.

FIELD

The embodiments discussed herein are related to the presentation of information on multiple devices.

BACKGROUND

People are using multiple types of devices to obtain information, merchandise, and services. For example, people may obtain information from a desktop or laptop computer as well as from mobile devices, such as smart phones and tablets. In some circumstances, people may begin to obtain information on a first device and then transfer over to a second device to continue to obtain the same information.

The subject matter claimed herein is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which:

FIG. 2b illustrates an example of a second configuration of the webpage of FIG. 2a;

DESCRIPTION OF EMBODIMENTS

Figure 1:
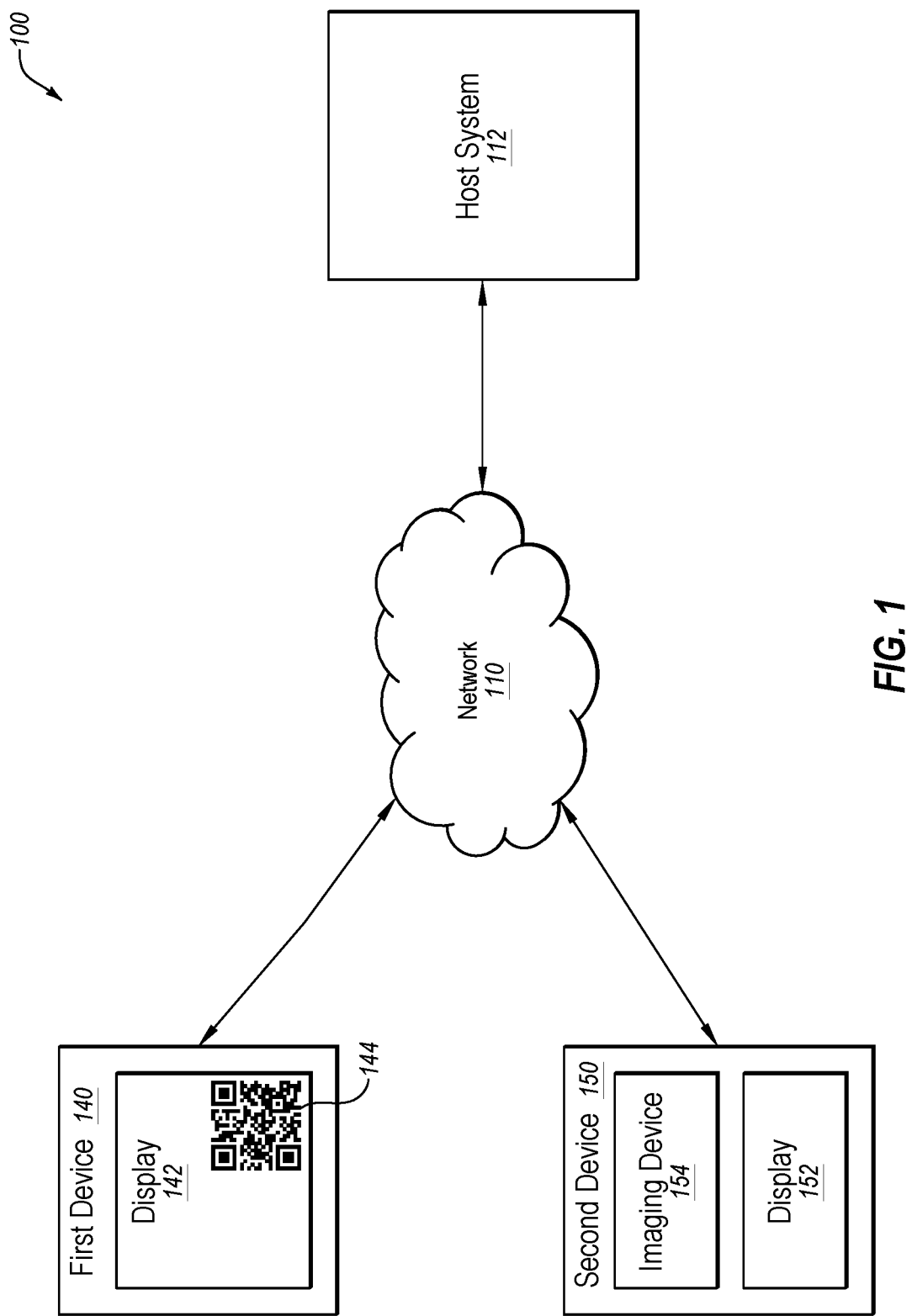
FIG. 1 illustrates an example system that may be used to present information on multiple devices.

Some embodiments herein relate to operations to present information on multiple devices. For example, a user may navigate to a webpage on a first device, such as a desktop computer. After navigating to the webpage, the user may leave the first device, but may desire to continue viewing or interacting with the webpage on a second device, such as a smartphone. To avoid having to reenter the uniform resource locator (URL) on the second device to navigate to the webpage, the webpage may include a barcode, such as a quick response (QR) code. The QR code may include the URL of the webpage. The user may capture and decode the QR code with the second device. In this manner, the second device may obtain the URL of the webpage without the user having to enter the URL into the second device. The second device may then use a web browser to navigate to the webpage to allow the user to continue to view or interact with the webpage on the second device.

In some embodiments, the user may interact with the webpage on the first device in a way to change a configuration of the webpage as presented on the first device. For example, the webpage may include javascript or some other code that may adjust the configuration of the webpage based on user input. For example, the webpage may include multiple listings and buttons to allow a user to sort the listings. The code may adjust the listings presented by the webpage without navigating away from the webpage. In these and other embodiments, data regarding the user input may be captured. The QR code presented on the webpage that indicates the URL of the webpage may be updated to include the URL of the webpage and the data that indicates the user interaction with the webpage.

In these and other embodiments, the user may capture and decode the QR code with the second device. The second device may load the webpage using the URL decoded from the QR code. The second device may also automatically change the configuration of the webpage based on the data decoded from the QR code. As a result, the user may be presented with the webpage on the second device in the configuration that was presented on the first device.

As an example, a user may be searching for tickets to an athletic contest using an on-line ticket retailer. The user may navigate to the webpage that lists different tickets using a desktop computer. Without navigating away from the webpage, the user may change listings presented by the webpage based on sorting criteria on the webpage such as a number of tickets, ticket price, ticket location in the venue, etc. A QR code on the webpage may dynamically change after each user interaction with the webpage to include the webpage URL and the current configuration of the webpage. For example, the webpage when initially presented may provide over one thousand tickets for sale. The user may have sorted the available tickets based on price and ticket location such that the webpage indicates ten tickets that meet the user's criteria. The webpage may automatically update the QR code based on the configuration of the webpage that indicates the ten tickets. The user may capture and decode the updated QR code on a second device, such as a mobile phone. Using the URL and the data from the decoded QR code, the webpage with the configuration of ten tickets that meet the user's criteria may be presented by the second device.

Turning to the figures, FIG. 1 illustrates an example system 100 that may be used to present information on multiple devices. The system 100 may be arranged in accordance with at least one embodiment described in the present disclosure. The system 100 may include a network 110, a host system 112, a first device 140 that includes a display 142, and a second device 150 that includes a display 152 and an imaging device 154.

The network 110 may be configured to communicatively couple the host system 112 with the first device 140 and the second device 150. In some embodiments, the network 110 may be any network or configuration of networks configured to send and receive communications between devices. In some embodiments, the network 110 may include a conventional type network, a wired or wireless network, and may have numerous different configurations. Furthermore, the network 110 may include a local area network (LAN), a wide area network (WAN) (e.g., the Internet), or other interconnected data paths across which multiple devices and/or entities may communicate. In some embodiments, the network 110 may include a peer-to-peer network. The network 110 may also be coupled to or may include portions of a telecommunications network for sending data in a variety of different communication protocols. In some embodiments, the network 110 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, etc. The network 110 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 110 may include one or more IEEE 802.11 wireless networks.

In some embodiments, the host system 112 may include any configuration of hardware, such as servers and databases that are networked together and configured to perform a task. For example, the host system 112 may include a single computing system that includes one or more processors and memory, such as a server or some other computing system configured to perform operations as described in this disclosure. Alternately or additionally, the host system 112 may include multiple computing systems, such as multiple servers, that are networked together and configured to perform operations as described in this disclosure. In some embodiments, the host system 112 may include computer-readable-instructions that are configured to be executed by one or more devices in the system 100, such as the first device 140 and/or the second device 150 to perform operations described in this disclosure.

In some embodiments, the host system 112 may include a web server that hosts webpages of a website that are accessed through URLs. In these and other embodiments, the host system 112 may include code, such as HTML and javascript code that may be provided to devices based on received requests. The host system 112 may further provide additional data as requested from a device based on instructions from the code provided by the host system 112 executed on the device. For example, the first device 140 may send a request with a URL of a webpage. The host system 112 may respond to the request by sending code to the first device 140. Execution of the code by the first device 140 may cause the first device 140 to request further data with respect to the webpage, such as images, listings, or other data from the host system 112. The host system 112 may access the requested data and send the data to the first device 140. The host system 112 may respond in a similar manner to the second device 150 or any other device coupled to the network 110.

In some embodiments, the host system 112 may be configured as an online marketplace for a seller or sellers to sell goods to buyers. In these and other embodiments, the host system 112 may host webpages of items for sale. The data that may be requested based on execution of the code for the webpage may be images or additional listings of particular items. Alternately or additionally, the host system 112 may be configured as any other client or user centric type system.

The first device 140 may be any electronic device configured to provide a user with access to one or more systems, which may include one or more servers and databases, such as the host system 112 through a network, such as the network 110. For example, the first device 140 may include a desktop computer, a laptop computer, a smartphone, a mobile phone, a tablet computer, or any other processing device configured to access information over a network or internally.

In some embodiments, the first device 140 may be configured to receive input from a user and to present information and/or data to the user. For example, a user may interact with the first device 140 and direct the first device 140 to request a webpage from the host system 112. In these and other embodiments, the user may interact with the first device 140 through a browser. In some embodiments, the user may direct the first device 140 to request the webpage by providing the first device 140 with a URL of the webpage. Alternately or additionally, the user may use the first device 140 to determine the URL of the webpage and may direct the first device 140 to request the webpage from the host system 112.

In response to the direction of the user, the first device 140 may send the URL to the host system 112. The host system 112 may use the URL to identify the webpage requested. Based on the request, the host system 112 may provide code to the first device 140 over the network 110. The code may be HTML code. Alternately or additionally, the code may be any other type of coding language that may be used by a browser or other application to render webpages.

The first device 140 may receive the code. Based on the received code, the first device 140, through an application such as a web browser, may present the webpage to the user through the display 142. Alternately or additionally, the first device 140 may present information from the webpage or the webpage using another medium, such as through audio or tactile response. In some embodiments, the code provided by the host system 112 may include client side code that may be executed by the first device 140. For example, the client side code may be javascript. The first device 140 may execute the client side code. Based on the execution of the client side code, the user may interact with the webpage to change a configuration of the webpage without navigating away from the webpage. In other words, the information presented on the display 142 through a web browser that is included on the webpage may change without the web browser navigating to a different URL.

For example, the webpage may include elements through which a user may interact with the webpage. The client-side code executed by the first device 140 may obtain the user interactions and change the configuration of the webpage accordingly. For example, the configuration of the webpage may change by changing the ordering or display of information presented on the webpage. Alternately or additionally, the client-side code may request additional data from the host system, such as images, item listings, or other information, for including in the webpage. In these and other embodiments, the client-side code may send the request to the host system 112, the host system 112 may respond with the data, and the client-side code may present the data in the webpage to the user.

In some embodiments, the webpage may include a barcode 144. The webpage may include the barcode 144 such that the barcode 144 is displayed on the display 142. In some embodiments, the barcode 144 may be a machine-readable optical label. For example, the barcode 144 may be a two-dimensional machine-readable optical label. In some embodiments, the barcode 144 may be a quick response (QR) code.

The barcode 144 may include encoded data about the webpage. For example, the barcode 144 may include an encoded URL or part of the URL of the webpage. For example, the barcode 144 may include an encoded resource name of the URL. As an example, the URL of a webpage may include "http://www.examplepage.com." The resource name of the URL may include "examplepage.com."

In some embodiments, the barcode 144 may include application data. For example, the barcode 144 may include application data related to the information presented by the webpage. For example, the application data may include instructions for a native application running on a device to request the information presented by the webpage for presentation by the native application. In these and other embodiments, the native application may be a non-web browser application that is specifically coded to present information presented by the webpage. For example, the native application may be associated with the webpage or the entity that controls the webpage. For example, the native application may be produced by the entity that produces the webpage.

In some embodiments, the data about the webpage encoded in the barcode 144 may include data about a present configuration of the webpage. In these and other embodiments, the data about the present configuration of the webpage may be data that may be used by the first device 140 to generate the present configuration of the webpage given an initial presentation of the webpage based on the webpage as provided from the host system 112 when the URL of the webpage is requested.

For example, a webpage may include a list of items that is sortable based on one or more criteria. An initial presentation of the webpage may have the items sorted in a first manner and a present configuration of the webpage may be sorted in a second manner. The data may indicate the criteria used to sort the list such that the webpage may be changed from an initial configuration to a present configuration with the items sorted in the second manner.

In some embodiments, the barcode 144 may be dynamically updated based on user interaction with the webpage. For example, in some embodiments, when the webpage is initially presented and before user interaction with the webpage, the barcode 144 may include the URL of the webpage and/or the application data. In these and other embodiments, the barcode 144 may be generated by the first device 140 using client-side code provided by the host system 112. Alternately or additionally, the host system 112 may provide information for presenting the barcode 144.

After some changes to the webpage, which may be based on user interaction with a webpage, the barcode 144 may be dynamically updated to include the URL of the webpage and data about the present configuration of the webpage and/or the URL of the webpage, the application data, and data about the present configuration of the webpage. In these and other embodiments, the client-side code provided by the host system 112 may generate the updated barcode 144 and present the updated barcode 144 for display on the display 142. In this manner, the barcode 144 presented on the display 142 may include the URL of the webpage and data for a present configuration of the webpage. Alternately or additionally, the user interactions may be provided to the host system 112 and the host system 112 may generate the updated barcode 144 and provide the updated barcode 144 to the first device 140.

The second device 150 may be any electronic device configured to provide a user with access to one or more systems, which may include one or more servers and databases, such as the host system 112, through a network, such as the network 110. For example, the second device 150 may include a desktop computer, a laptop computer, a smartphone, a mobile phone, a tablet computer, or any other processing device configured to access information over a network or internally.

In some embodiments, the second device 150 may be configured to receive input from a user and to present information and/or data to the user. For example, a user may interact with the second device 150 and direct the second device 150 to capture an image of the barcode 144 using the imaging device 154. The imaging device 154 may include any type of device configured to capture an image, such as a camera, video recorder, or other device.

After capturing the image of the barcode 144, the second device 150 may decode the barcode 144. The barcode 144 may be decoded using software installed on the second device 150. In some embodiments, the software may be generic software configured to decode barcodes. Alternately or additionally, the software may be specific to an application. For example, the application may be produced and/or associated with the producers of the webpage that includes the barcode 144. After decoding the barcode 144, the second device 150 may obtain the data in the barcode, for example, the URL of the webpage, the application data, and/or the data about the configuration of the webpage.

In some embodiments, the second device 150 may automatically request the webpage from the host system 112 over the network 110 using the URL. The host system 112 may use the URL to identify the webpage requested. Based on the request, the host system 112 may provide code to the second device 150 over the network 110.

The second device 150 may receive the code. Based on the received code, the second device 150, through an application such as a web browser, may prepare to present the webpage to the user through the display 152. The code provided by the host system 112 may also include client side code that may be executed by the second device 150. The second device 150 may use the code to alter the configuration of the webpage based on the data decoded from the barcode 144. The altered webpage may be presented on the display 152.

In some embodiments, the altered configuration of the webpage may be presented by a web browser application on the second device 150 in the same manner that the webpage is presented by a web browser on the first device 140.

Figure 2A:
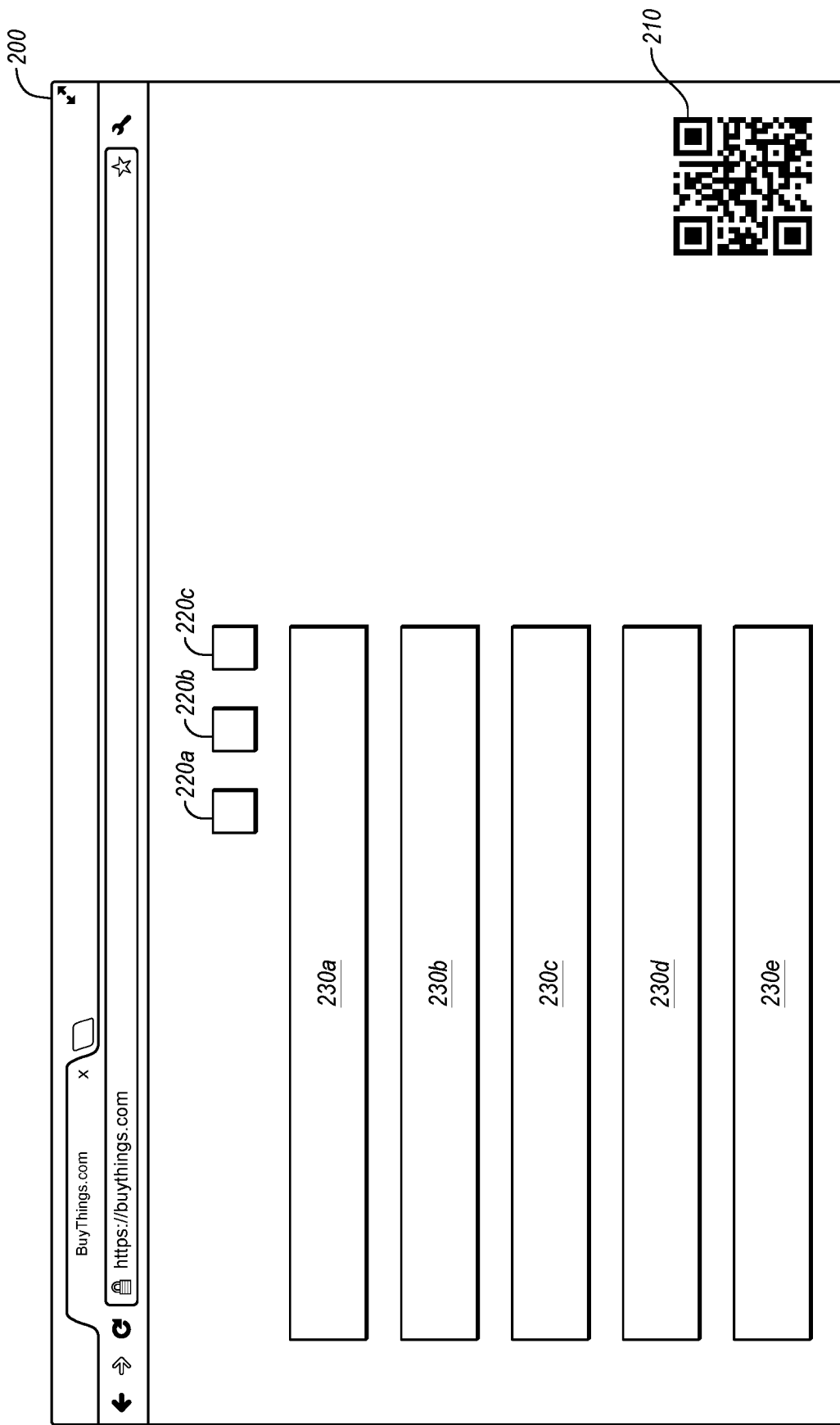
FIG. 2a illustrates an example of a first configuration of a webpage presented on a display of a first device.
Figure 2B:
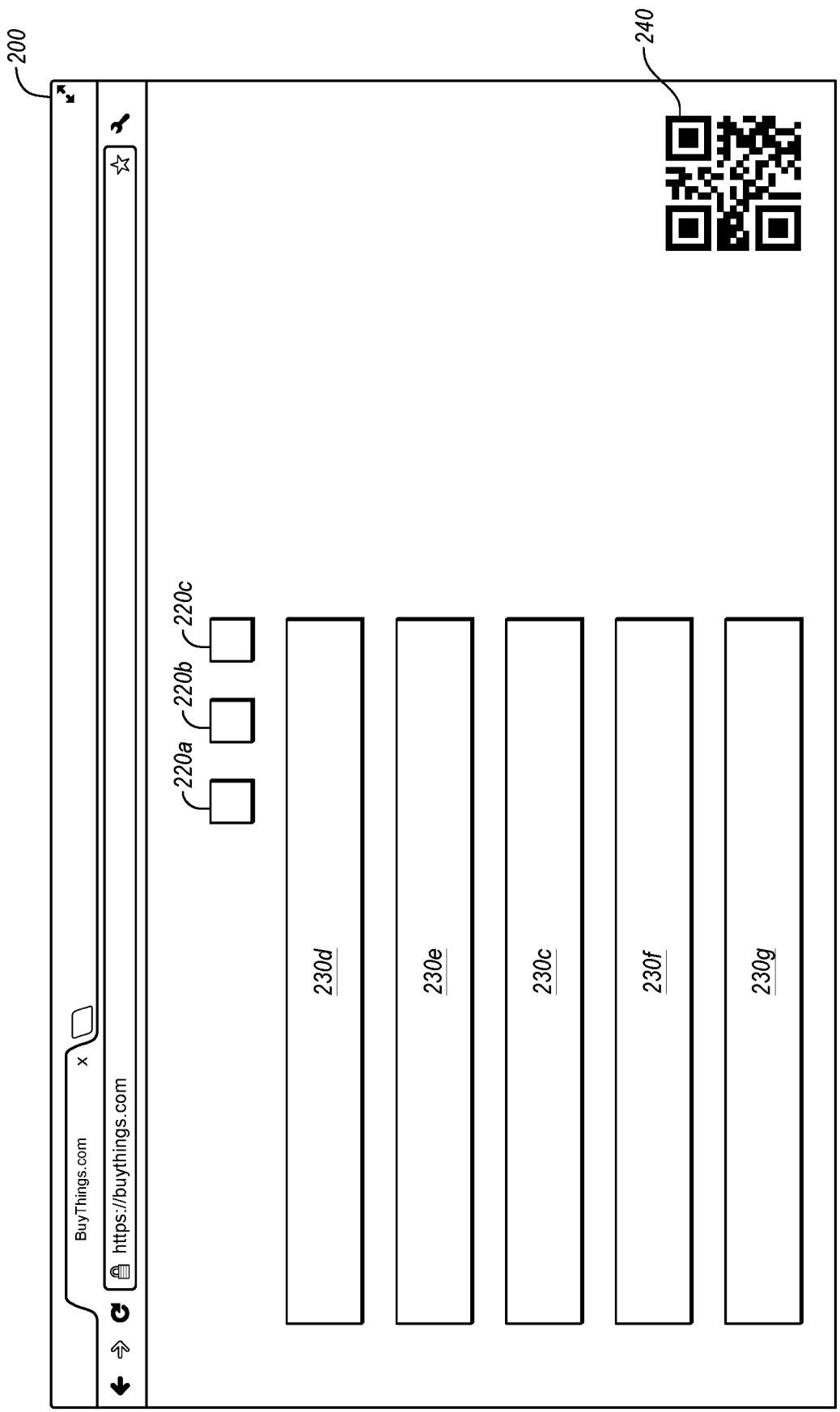
Figure 2C:
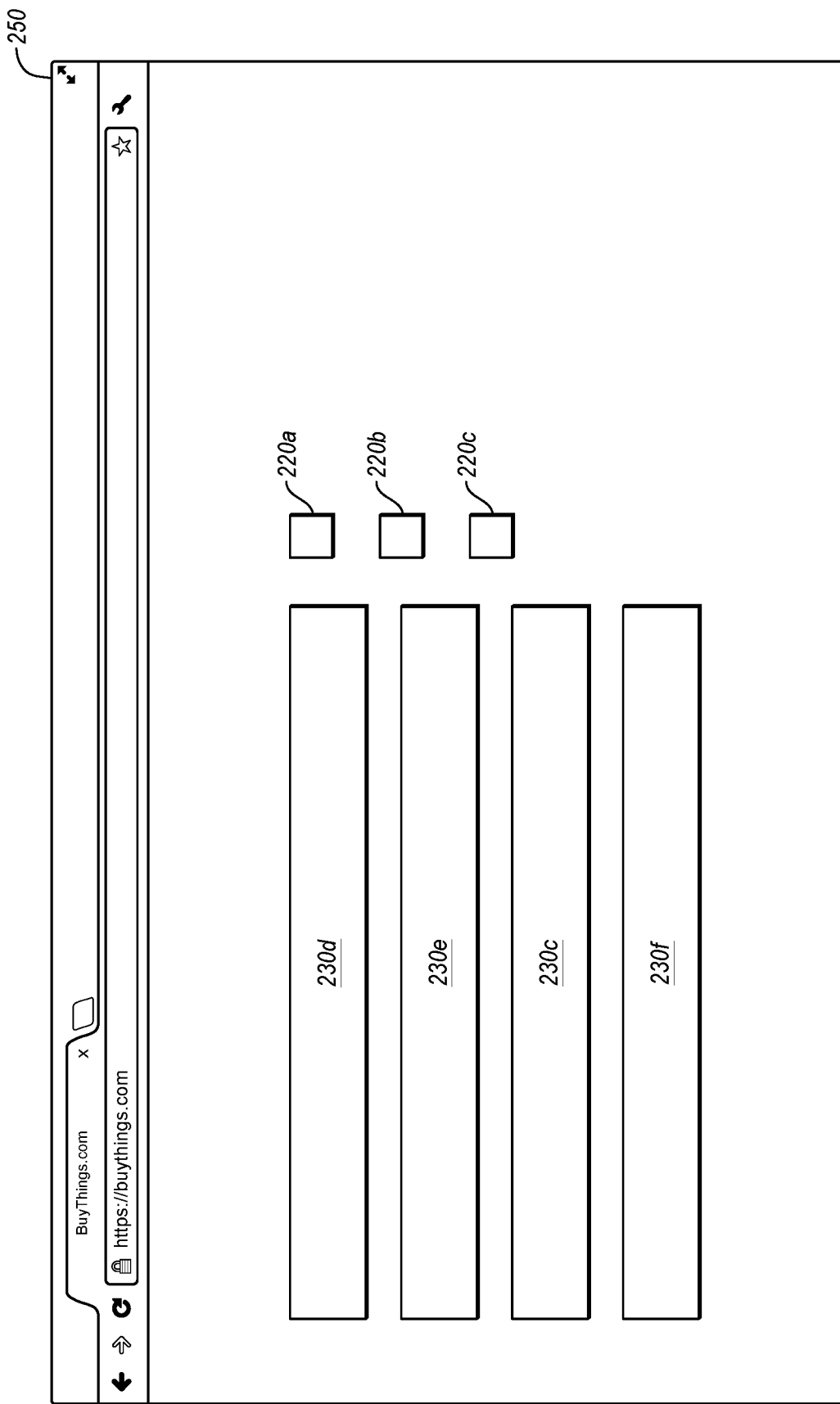
FIG. 2c illustrates an example of the second configuration of the webpage of FIG. 2b presented on a display of a second device.

In some embodiments, the webpage may include the information presented by the webpage on the first device 140 but may not include the exact same configuration. In these and other embodiments, the information may be presented by the webpage such that parts of the information are positioned in the same relative position with respect to each other. For example, in some embodiments, the second device 150 may be a different type of device than the first device 140. In these and other embodiments, the display 152 may be smaller than the display 142. Thus, the information may be arranged differently when presented on the display 152 than the display 142. However, the positional relationship of the ordered information on the webpage may be maintained across both displays. FIGS. 2a-2c further illustrate the different arrangement of information while maintaining a positional relationship of the ordered information.

In some embodiments, the second device 150 may not receive information from the host system 112 to present the webpage. Rather, in these and other embodiments, the second device 150 may receive the information presented by the webpage for presenting to the user by another application running on the second device 150 that is associated with the webpage. In these and other embodiments, the second device 150 may decode the barcode 144 using the other application. For example, the other application may be specifically designed to present information that is presented by the webpage. For example, the webpage may be part of an on-line marketplace and the other application may be an application designed and provided by the on-line marketplace for use on the second device 150.

For example, the other application may decode the barcode 144 and provide the URL and the data to the host system 112. The host system 112 may recognize the URL and determine the information provided by the webpage of the URL. The host system 112 may provide the information to the second device 150. The second device 150 may receive the information and may automatically present the information by way of the other application on the display 152. In some embodiments, the other application may send the data to the host system 112. In these and other embodiments, the host system 112 may use the data to configure the information such that it is presented by the second device 150 in a similar manner that the information was presented on the webpage on the first device 140. Alternately or additionally, the second device 150 may receive the information from the host system 112 and may configure the information based on the data such that the information is presented by the second device 150 in a similar manner that the information was presented on the webpage on the first device 140.

In some embodiments, the second device 150 may automatically request the information presented by webpage from the host system 112 over the network 110 using the application data and not using the URL. The host system 112 may use the application data to identify the information requested. Based on the request, the host system 112 may provide the information to the second device 150 over the network 110.

In these and other embodiments, the second device 150 may receive the information from the host system 112. The native application running on the second device 150 may automatically present the information by way of the native application on the display 152. In some embodiments, the native application may send the data to the host system 112. In these and other embodiments, the host system 112 may use the data to configure the information such that it is presented by the native application in a similar manner that the information was presented on the webpage on the first device 140. Alternately or additionally, the native application may receive the information from the host system 112 and may configure the information based on the data such that the information is presented by the native application in a similar manner that the information was presented on the webpage on the first device 140.

An example follows of the operation of the system 100. A user may navigate to a webpage on the first device 140, which may be a desktop computer. The user may configure a listing of items on the webpage based on the price. A barcode 144 on the webpage may be encoded with the URL of the webpage and data indicating the sorting of the listing of items by price. The user may use the second device 150, which may be a mobile device such as a smartphone, to capture the barcode 144. The second device 150 may automatically request the webpage from the host system 112 and may configure the listing of items on the webpage based on the price and present the configured webpage on the display 152.

As another example, a first user may navigate to a webpage on the first device 140, which may be a mobile device. The first user may configure a listing of items on the webpage based on the price. The barcode 144 may be encoded with the URL of the webpage and data indicating the sorting of the listing of items by price. A second user may use the second device 150, which may be a mobile device, to capture the barcode 144. The second device 150 may automatically request the webpage from the host system 112 and may configure the listing of items on the webpage based on the price. In this manner the second user may more easily access the webpage with the listings configured by price. The second user may then purchase an item identified in the listing.

Modifications, additions, or omissions may be made to the system 100 without departing from the scope of the present disclosure. For example, the host system 112 may include additional components and/or networks than those illustrated in or described with respect to FIG. 1. For example, the host system 112 may include additional databases, servers, and other computing systems configured to perform other tasks for the host system 112.

Alternately or additionally, the system 100 may include additional devices. In these and other embodiments, the additional devices may each capture the barcode 144 from the first device 140. For example, if the website is a ticket retailer, one user could find tickets on the first device 140. Other users may be directed to the same tickets on different devices. In this manner, multiple users may each buy tickets and avoid the hassle of a single user buying all the tickets and being repaid by other users.

FIG. 2a illustrates an example of a first configuration of a webpage 200 presented on a display of a first device. The webpage 200 may be arranged in accordance with at least one embodiment described in the present disclosure. The webpage 200 may be implemented by a web browser.

The webpage 200 may include a first barcode 210. The first barcode 210 may be included on the webpage 200. The first barcode 210 may be encoded with the URL of the webpage 200.

The webpage 200 may further include a first sorting element 220a, a second sorting element 220b, and a third sorting elements 220c, referred to in this disclosure as the sorting elements 220. The webpage 200 may further include a first list element 230a, a second list element 230b, a third list element 230c, a fourth list element 230d, and a fifth list element 230e, referred to in this disclosure as the list elements 230.

A user may interact with the sorting elements 220. In some embodiments, a user may select one or more of the sorting elements 220. For example, the user interaction with the sorting elements 220 may include hovering over the sorting elements 220. Alternately or additionally, a user may interact with the sorting elements 220 by engaging with the sorting elements 220, for example, by clicking the sorting elements 220.

In some embodiments, each of the sorting elements 220 may include a different description or identifier. The descriptions or identifiers may be associated with how the list elements 230 are sorted upon the selection of the sorting elements 220. Upon selection of one or more of the sorting elements 220, the list elements 230 may change position, new list elements 230 may appear, and/or some of the presented list elements 230 may be removed. As a result, the configuration of the webpage 200 may change from a first configuration to a second configuration. Modifications, additions, or omissions may be made to the webpage 200 in the first configuration without departing from the scope of the present disclosure.

FIG. 2b illustrates an example of a second configuration of the webpage 200 of FIG. 2a. The webpage 200 may be arranged in accordance with at least one embodiment described in the present disclosure. In the second configuration of the webpage 200, the first list element 230a and the second list element 230b may be removed from the webpage 200. Furthermore, the position of the third list element 230c and the fourth list element 230d may have moved in relation to each other. Alternately or additionally, the webpage 200 may further include a sixth list element 230f and a seventh list element 230g that may be included in the list elements 230.

The first barcode 210 may have been removed and replaced with a second barcode 240. The second barcode 240 may be encoded with the URL of the webpage 200 and data regarding the user interactions with the sorting elements 220. Modifications, additions, or omissions may be made to the webpage 200 in the second configuration without departing from the scope of the present disclosure.

FIG. 2c illustrates an example of the second configuration of a webpage 250 presented on a display of a second device. The webpage 250 may be arranged in accordance with at least one embodiment described in the present disclosure. The webpage 250 may be implemented by a web browser.

In some embodiments, the webpage 250 may be presented using the URL and the data decoded from the second barcode 240. As illustrated, the webpage 250 includes the list elements 230 presented in the second configuration of the webpage 200. Note however that the sorting elements 220 are moved with respect to the list elements 230. In these and other embodiments, however, the positional relationship of the ordered information on the webpage 200 in the second configuration, e.g., the list elements 230, is maintained. Modifications, additions, or omissions may be made to the webpage 250 without departing from the scope of the present disclosure.

Figure 3:
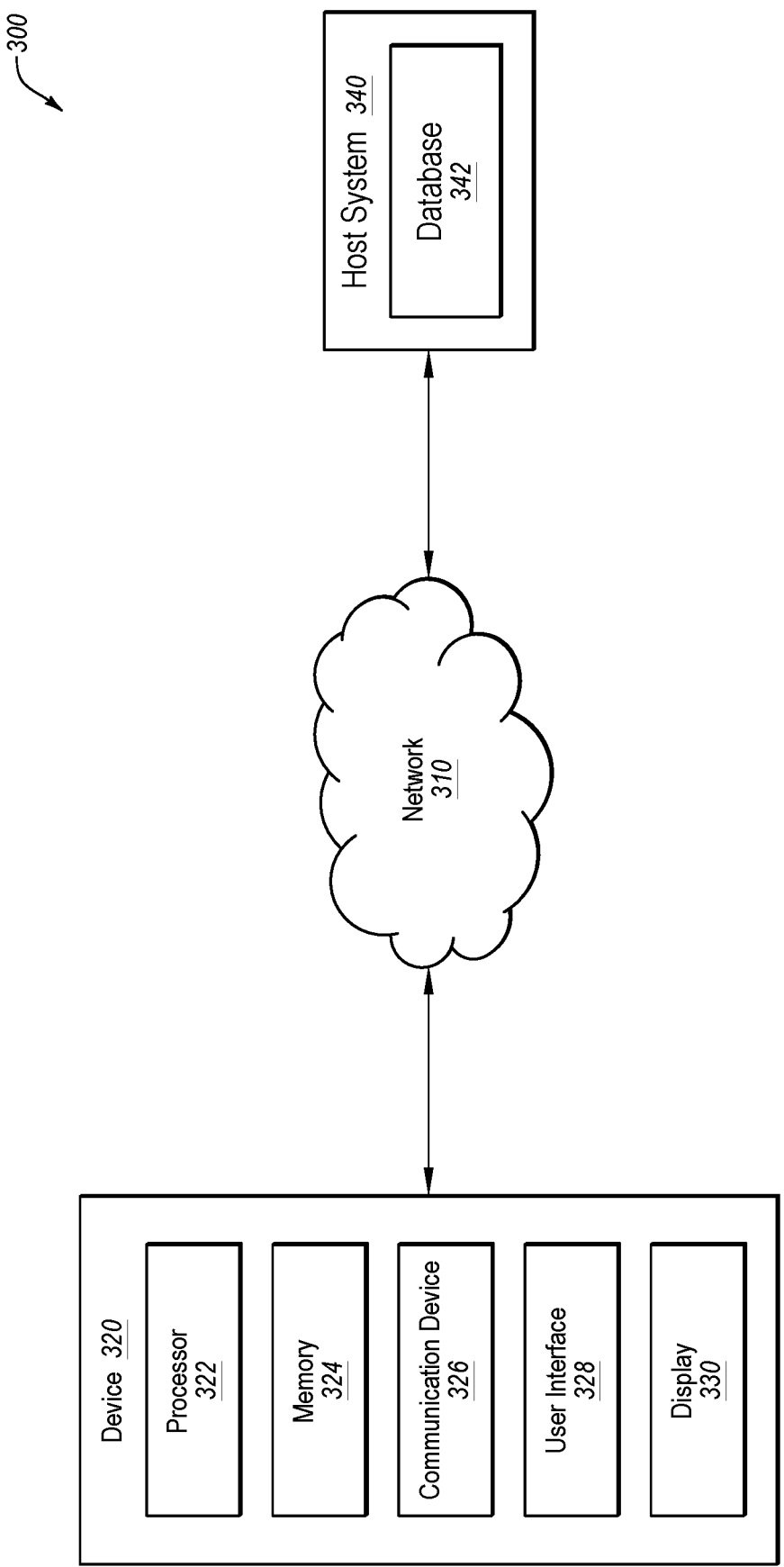
FIG. 3 illustrates an example system that may be part of a system that presents information on multiple devices.

FIG. 3 illustrates an example system 300 that may be part of a system that presents information on multiple devices. The system 300 may be arranged in accordance with at least one embodiment described in the present disclosure. The system 300 may include a network 310; a device 320 that includes a processor 322, a memory 324, a communication device 326, a user interface 328, and a display 330; and a host system 340 that includes a database 342.

The network 310 may be configured to communicatively couple the host system 340 with the device 320. In some embodiments, the network 310 may be analogous to the network 110 of FIG. 1.

The host system 340 may be analogous to the host system 112 of FIG. 1. As illustrated, the host system 340 may include a database 342 that may include information to assist in presenting a webpage on the display 330. For example, the database 342 may include code for presenting a webpage and client-side code for adjusting a configuration of the webpage. The code may include HTML code and the client-side code may include javascript.

In some embodiments, the device 320 may include a processor 322 and a memory 324. In general, the processor 322 may include any suitable special-purpose or general-purpose computer, computing entity, or processing device including various computer hardware or software modules and may be configured to execute instructions stored on any applicable computer-readable storage media. For example, the processor 322 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, it is understood that the processor 322 may include any number of processors configured to perform individually or collectively any number of operations described herein. Additionally, one or more of the processors may be present on one or more different electronic devices, such as different servers. In some embodiments, the processor 322 may interpret and/or execute program instructions and/or process data stored in the memory 324. In some embodiments, the processor 322 may fetch program instructions and load the instructions in the memory 324. After the instructions are loaded into memory 324, the processor 322 may execute the program instructions to perform operations or methods described in this disclosure. For example, the processor 322 may receive instructions, load the instructions into the memory 324, and execute the instructions to perform the operations described in this disclosure. For example, in some embodiments, different applications may provide instructions to the processor 322 for execution. For example, a web browser application may receive code and provide instructions to the processor 322 for execution.

The memory 324 may include computer-readable storage media for carrying or having computer-executable instructions or data structures stored thereon. Such computer-readable storage media may be any available media that may be accessed by a general-purpose or special-purpose computer, such as the processor 322. By way of example, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 322 to perform a certain operation or group of operations.

The communication device 326 may include any component, device, system, or combination thereof that is configured to transmit or receive information over the network 310 or over other networks or systems. In some embodiments, the communication device 326 may communicate with other devices at other locations, the same location, or even other components within the same system. For example, the communication device 326 may include a modem, a network card (wireless or wired), an infrared communication device, a wireless communication device (such as an antenna), and/or chipset (such as a Bluetooth device, an 802.6 device (e.g. Metropolitan Area Network (MAN)), a WiFi device, a WiMax device, cellular communication facilities, etc.), and/or the like. The communication device 326 may permit data to be exchanged with a network and/or any other devices described in the present disclosure.

The user interface 328 may include any component, device, system, or combination thereof that is configured to provide input from a user to the device 320. For example, the user interface 328 may include a mouse, a track pad, a touch screen, a keyboard, or any other device that may interface with the device 320 to provide user input to the device 320.

The device 320 may act as the first device 140 or the second device 150 of FIG. 1. When the device 320 is acting as the first device 140, the communication device 326 may obtain a code from the database 342 of the host system 340. The code may be processed by a web browser application and executed by the processor 322 to present a webpage in the display 330. A user may interact with the device 320 by way of the user interface 328. The user interface 328 may provide the user interactions to a web browser application that may use the code from the database 342 to interpret the user interactions and change the configuration of the webpage.

In some embodiments, the code may direct the web browser to update a barcode on the display based on the user interactions. For example, the barcode may represent the URL of the webpage. For example, www.buythings.com/shirt/men. To update the barcode, the web browser may change the data represented by the barcode. Previously, the data may be the URL of the webpage. The data may be updated to include the URL of the webpage and one or more variables with values that represent the user interaction with the webpage. For example, the data may be www.buythings.com/shirt/men?price=15. The updated barcode may be encoded with the data and presented on the display 330.

When the device 320 is acting as the second device 150 of FIG. 1, the device 320 may obtain the barcode with the URL and the data regarding a configuration of the webpage. The device 320 may decode the barcode and provide the decoded data to a web browser. The web browser may request the webpage from the host system 340 using the URL portion of the decoded data. The code from the host system 340 may instruct the web browser to parse the remaining portion of the decoded data to obtain the variables and their values. Based on the variables and their values, the web browser may adjust a configuration of the webpage as received from the host system 340 and present the adjusted configuration of the webpage on the display 330.

Modifications, additions, or omissions may be made to the system 300 without departing from the scope of the present disclosure. For example, the system 300 may include multiple devices.

Figure 4:
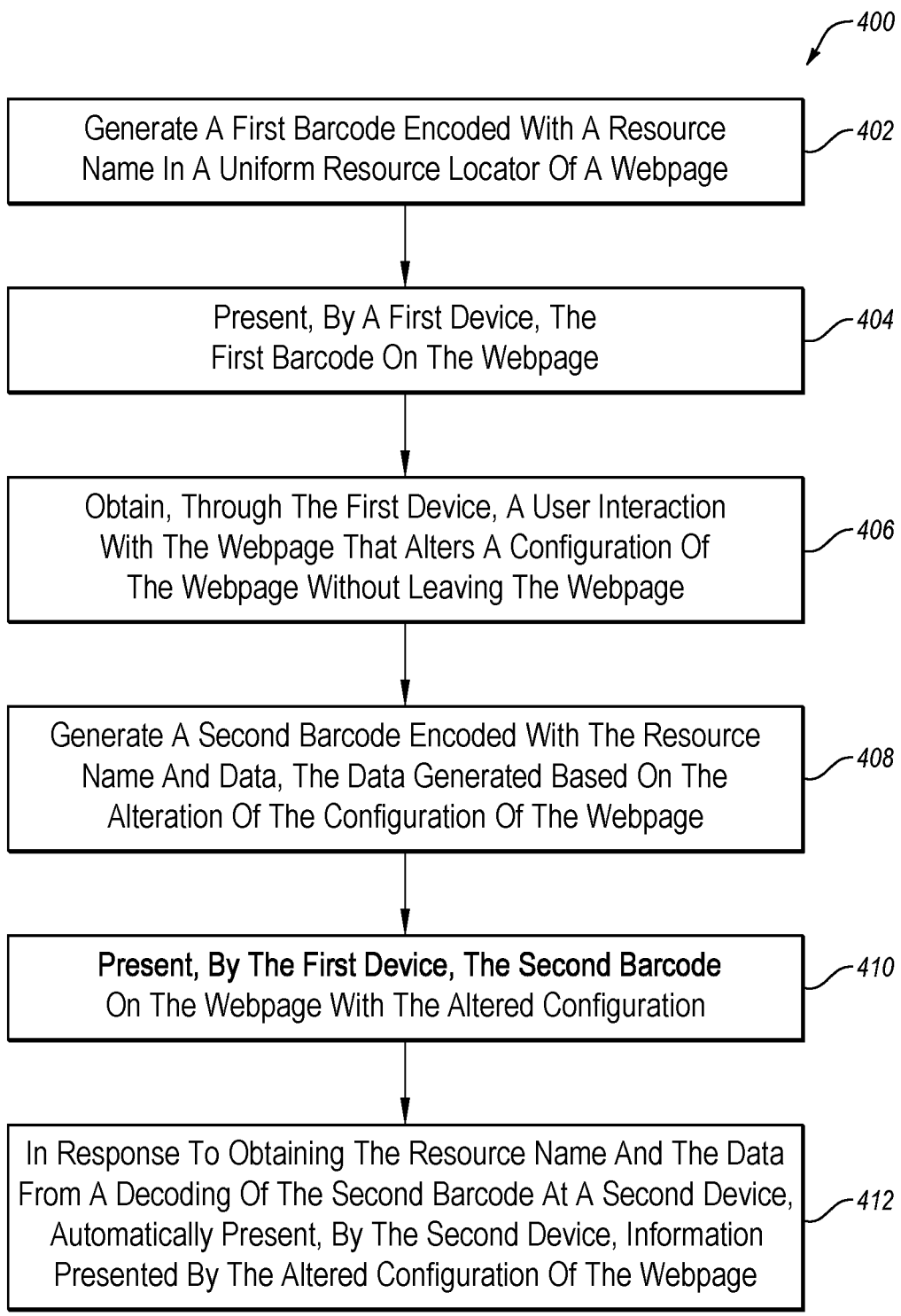
FIG. 4 is a flowchart of example operations to present information on multiple devices.

FIG. 4 is a flowchart of example operations 400 to present information on multiple devices. The operations 400 may be arranged in accordance with at least one embodiment described in the present disclosure. The operations 400 may be performed, in some embodiments, by a system, such as the system 100 and/or 300 of FIGS. 1 and 3, respectively. In these and other embodiments, the operations 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The operations 400 may begin at block 402, where a first barcode encoded with a resource name in a uniform resource locator of a webpage may be generated. In block 404, the first barcode may be presented on the webpage by a first device.

In block 406, a user interaction with the webpage that alters a configuration of the webpage without leaving the webpage may be obtained through the first device. In some embodiments, the configuration of the webpage may be altered by javascript running on the first device that is provided by a system that hosts the webpage.

In block 408, a second barcode encoded with the resource name and data may be generated. The data may be generated based on the alteration of the configuration of the webpage. In some embodiments, the first barcode and the second barcode are two dimensional machine-readable optical labels.

In block 410, the second barcode may be presented by the first device on the webpage with the altered configuration.

In block 412, in response to obtaining the resource name and the data from a decoding of the second barcode at a second device, information presented by the altered configuration of the webpage may be automatically presented by the second device. In some embodiments, the information automatically presented may be presented by a non-web browser application on the second device. In some embodiments, the information automatically presented may be the altered configuration of the webpage in a web browser application on the second device.

In some embodiments, the first device may be a desktop computer and the second device may be a smartphone. In some embodiment, the first device may obtain the code for presenting the webpage from a system using the resource name. In these and other embodiments, the second device may obtain the information presented by the altered configuration of the webpage from the system using the resource name as decoded from the second barcode.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For instance, in some embodiments, the operation of automatic presentation may further include configuring the webpage based on code received from a hosting system and altering the webpage based on the data to match the altered configuration of the webpage as presented on the first device.

Figure 5:
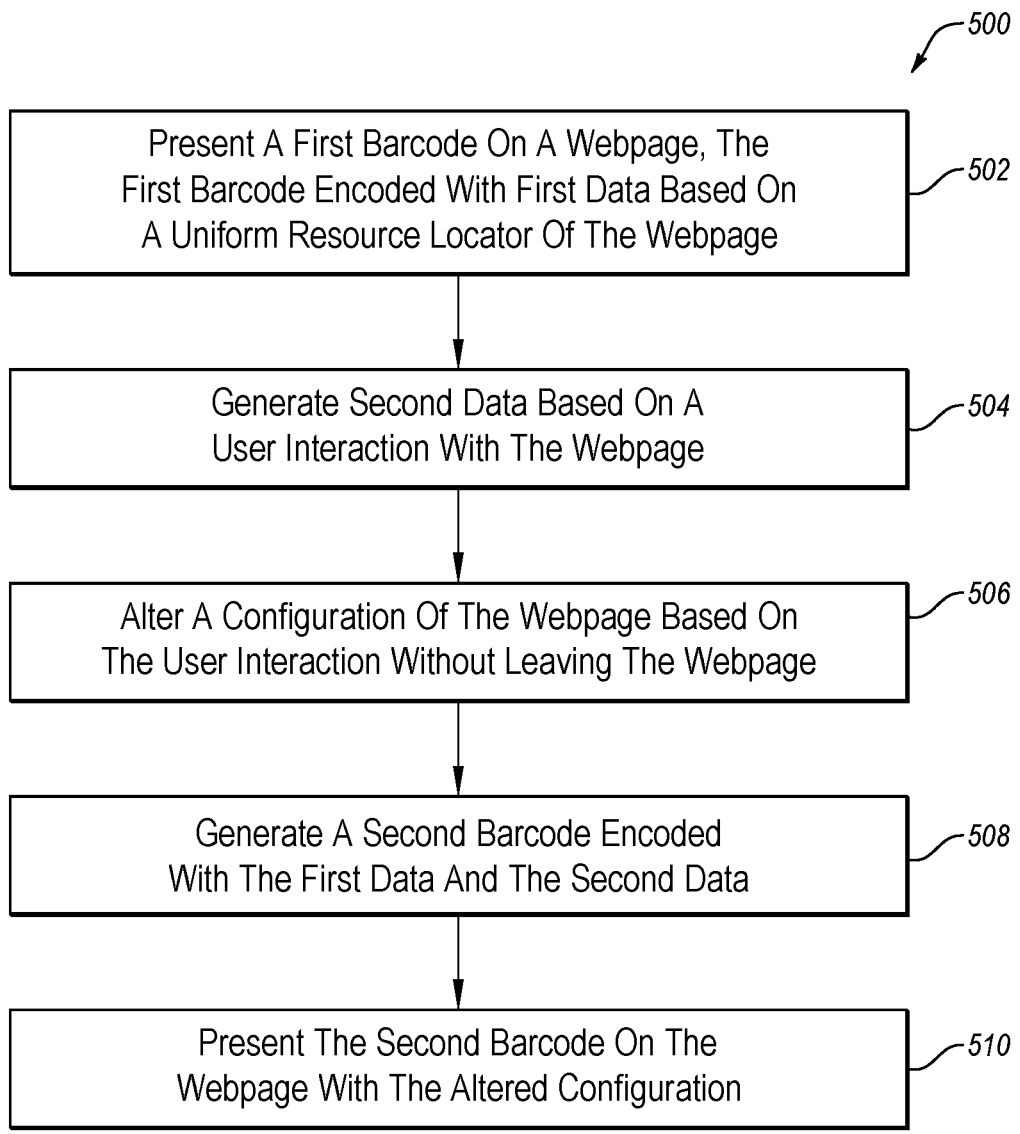
FIG. 5 is a flowchart of an example computer-implemented method of information presentation on multiple devices.

FIG. 5 is a flowchart of an example computer-implemented method 500 of information presentation on multiple devices. The method 500 may be arranged in accordance with at least one embodiment described in the present disclosure. The method 500 may be implemented, in some embodiments, by a system, such as the system 100 and/or 300 of FIGS. 1 and 3, respectively. Although illustrated as discrete blocks, various blocks may be divided into additional blocks, combined into fewer blocks, or eliminated, depending on the desired implementation.

The method 500 may begin at block 502, where a first barcode may be presented on a webpage. In some embodiments, the first barcode may be encoded with first data based on a uniform resource locator of the webpage.

In block 504, second data based on a user interaction with the webpage may be generated. In block 506, a configuration of the webpage may be altered based on the user interaction without leaving the webpage.

In block 508, a second barcode encoded with the first data and the second data may be generated. In block 510, the second barcode on the webpage with the altered configuration may be presented. In some embodiments, the first barcode and the second barcode may be two dimensional machine-readable optical labels.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 500 may further include decoding the second barcode at a device to obtain decoded first data and decoded second data and requesting information presented by the altered configuration of the webpage based on the decoded first data and the decoded second data. Alternately or additionally, the method 500 may further include presenting, by the device, the information without user interaction with the device.

In some embodiments, the device may be a first device and the other acts of presenting a first barcode, generating second data, altering a configuration, generating a second barcode, and presenting the second barcode may be performed by a second device. In some embodiments, the information is the altered configuration of the webpage in a web browser application of the device. Alternately or additionally, the information may be presented by a non-web browser application of the device.

As indicated above, the embodiments described herein may include the use of a special purpose or general purpose computer (e.g., the processor 322 of FIG. 3) including various computer hardware or software modules, as discussed in greater detail below. Further, as indicated above, embodiments described herein may be implemented using computer-readable media (e.g., the memory 324 or database 342 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the system and methods described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc., connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer-implemented method comprising:
    displaying, at a computing device, a webpage;
    presenting a barcode within the webpage displayed at the computing device, the barcode comprising encoded data associated with the webpage;
    detecting user interaction with the webpage; and
    updating the barcode presented within the webpage based on the user interaction with the webpage.

2. The computer-implemented method of claim 1, wherein the updated barcode includes data that indicates the user interaction with the webpage.

3. The computer-implemented method of claim 2, wherein the updated barcode includes a uniform resource locator (URL) of the webpage.

4. The computer-implemented method of claim 1, wherein updating comprises updating the barcode presented within the webpage based on the user interaction with the webpage without navigating to a different uniform resource locator (URL) of a different webpage.

5. The computer-implemented method of claim 1, wherein the user interaction causes information presented within the webpage to be presented differently within the webpage.

6. The computer-implemented method of claim 1, wherein the user interaction includes user input to the webpage.

7. The computer-implemented method of claim 1, wherein the barcode comprises a QR code.

8. One or more computer-readable storage media comprising instructions that, responsive to execution on a computing device, perform operations comprising:
    displaying, at the computing device, a webpage;
    presenting a barcode within the webpage displayed at the computing device, the barcode comprising encoded data associated with the webpage; and
    responsive to user interaction with the webpage, updating the barcode presented within the webpage based on the user interaction with the webpage.

9. The one or more computer-readable storage media of claim 8, wherein the updated barcode includes data that indicates the user interaction with the webpage.

10. The one or more computer-readable storage media of claim 8, wherein the updated barcode includes a uniform resource locator (URL) of the webpage.

11. The one or more computer-readable storage media of claim 8, wherein updating comprises updating the barcode presented within the webpage based on the user interaction with the webpage without navigating to a different uniform resource locator (URL) of a different webpage.

12. The one or more computer-readable storage media of claim 8, wherein the user interaction causes information presented within the webpage to be presented differently within the webpage.

13. The one or more computer-readable storage media of claim 8, wherein the user interaction includes user input to the webpage.

14. The one or more computer-readable storage media of claim 8, wherein the barcode comprises a QR code.

15. A computing device comprising:
    at least a memory and a processor configured to perform operations comprising:
    displaying, at the computing device, a webpage;
    presenting a barcode within the webpage displayed at the computing device, the barcode comprising encoded data associated with the webpage; and
    responsive to user interaction with the webpage, updating the barcode presented within the webpage based on the user interaction with the webpage.

16. The computing device of claim 15, wherein the updated barcode includes data that indicates the user interaction with the webpage.

17. The computing device of claim 15, wherein the updated barcode includes a uniform resource locator (URL) of the webpage.

18. The computing device of claim 15, wherein updating comprises updating the barcode presented within the webpage based on the user interaction with the webpage without navigating to a different uniform resource locator (URL) of a different webpage.

19. The computing device of claim 15, wherein the user interaction causes information presented within the webpage to be presented differently within the webpage.

20. The computing device of claim 15, wherein the user interaction includes user input to the webpage.

* * * * *